United States Patent Office.

JOHN JAMES BODMER, OF NEWPORT, GREAT BRITAIN.

*Letters Patent No. 70,510, dated November 5, 1867.*

IMPROVEMENT IN PREPARING CEMENTS FROM SLAGS.

*The Schedule referred to in these Letters Patent and making part of the same.*

TO ALL WHOM IT MAY CONCERN:

Be it known that I, JOHN JAMES BODMER, of Newport, in the county of Monmouth, in the United Kingdom of Great Britain and Ireland, have invented a new and useful Improvement in the Treatment of Slag-Cinder, &c.; and I do hereby declare that the following is a full, clear, and exact description thereof, which will enable others skilled in the art to make and use the same.

This invention relates to the manufacture of cements for various purposes, and the combination and use of new materials or substances therefor, whereby the said cements are adapted to many useful purposes; and the invention consists mainly in the use of slag-cinder or scoria, which flows from blast-furnaces, copper-smelting, and other furnaces, combined with lime and other substances, after being properly manipulated or prepared for the purpose.

In carrying out my invention, the slag or scoria is is received from the furnace in a fluid or semi-fluid state, and is then manipulated by being passed between rollers, or between a roller and a fixed surface, so that the slag or scoria may be formed into thin plates or scales, or be subjected to a grinding process, and either dropped into water while in its heated state, or allowed to cool in the atmosphere after being thus operated upon. By dropping it into water it is rendered more brittle, and better adapted to certain purposes, as a cement, than when it is allowed to cool in the open air. In thus operating upon the slag or scoria, it becomes, in a measure, purified and separated from the coarser and more useless cinders or substances with which it is in contact; but more especially does it become, when thus formed into scale or lamina, more suitable for grinding or reducing to powder, either separately or in combination with lime or other substances, to form the different cements for which it is intended. Lime, in its unslaked state, or in the form of a hydrate, is used in combination with the slag or scoria thus prepared, and after such combination the mixture may be subjected to any required degree of heat in a furnace, or the said combination may be formed without subjecting the same to heat, as may be deemed most expedient, to adapt it to certain desired purposes.

To adapt it to the various purposes for which it may be desired to use a cement of this description, it is necessary to vary the proportions of the substances of which it is composed, but ordinarily only about one-eighth part of lime is used in forming it.

It will, of course, be apparent that an artificial slag or scoria may be produced by placing the proper materials in a furnace or crucible and subjecting them to the required degree of heat. Proper proportions of silicious and argillaceous material melted together will form this slag, which, when subsequently mixed and amalgamated with lime, either slaked or unslaked, will produce the desired cement. A certain quantity of slag or scoria may be melted, together with such proportions of silicious or argillaceous material, either with or without a calcareous flux, as may be desirable for producing the required combination, and which may afterwards be incorporated with lime in the manner described. A certain proportion of alumina may be used to advantage, in combination with the materials already named, for certain purposes.

The cement may be formed by adding to the slag or scoria, as it flows from a furnace, in a fluid or semi-fluid state, lime or other calcareous matter, (with or without alumina,) in certain proportions, as the nature of the slag or scoria may require, to fit it for the desired purpose. The mass thus formed may be passed between rollers, as before described, and subsequently ground.

I do not confine myself to any particular method for mixing or amalgamating the substances of which I form the cement. In the latter case stated it may be found necessary to reheat and melt the mass before passing it through the rollers, and, as before stated, the various purposes to which cements of this description are applied, (as, for instance, for concrete and artificial stone, and many other uses of a similar nature,) it is necessary to vary not only the proportions of the materials used, but the ingredients or materials themselves, and the manner of their combination; but this does not change or affect the base or main feature of my invention, that is, the use of slag or scoria in the formation of cement.

Having thus described my invention, what I claim as new, and desire to secure by Letters Patent, is—

The use of slag or scoria produced by blast or other furnaces, (or when produced by other means,) in combination with lime, or with lime and alumina, in the formation of cement, substantially as described.

JOHN JAMES BODMER.

Witness:
    RUDOLPH BODMER,
    VICTOR HAGMANN.